(12) United States Patent
Remez et al.

(10) Patent No.: US 12,484,326 B2
(45) Date of Patent: Nov. 25, 2025

(54) IMAGING ARRAY WITH DIRECTIONAL RESPONSE

(71) Applicant: Apple Inc., Cupertino, CA (US)

(72) Inventors: Roei Remez, Tel Aviv (IL); Brian McCall, San Jose, CA (US); Milan Maksimovic, Sunnyvale, CA (US); Maoz Ovadia, Kiryat Ono (IL); Arnaud Laflaquière, Paris (FR); Gershon Rosenblum, Fremont, CA (US); Noah D Bedard, Los Gatos, CA (US); Omer Korech, Pardes Hanna Karkur (IL); Emanuel Mordechai, Mishmarot (IL); Keith Lyon, San Jose, CA (US); Refael Della Pergola, Jerusalem (IL); Niv Gilboa, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 288 days.

(21) Appl. No.: 18/302,822

(22) Filed: Apr. 19, 2023

(65) Prior Publication Data

US 2024/0089569 A1 Mar. 14, 2024

Related U.S. Application Data

(60) Provisional application No. 63/405,442, filed on Sep. 11, 2022.

(51) Int. Cl.
*H10F 39/00* (2025.01)
*G02B 27/00* (2006.01)
*G02B 27/40* (2006.01)

(52) U.S. Cl.
CPC ....... *H10F 39/806* (2025.01); *G02B 27/0012* (2013.01); *G02B 27/40* (2013.01); *H10F 39/8027* (2025.01)

(58) Field of Classification Search
None
See application file for complete search history.

(56) References Cited

U.S. PATENT DOCUMENTS

| 11,328,150 | B2* | 5/2022 | Fan | G02B 3/0056 |
|---|---|---|---|---|
| 2007/0109438 | A1* | 5/2007 | Duparre | G02B 3/0056 348/335 |
| 2009/0179142 | A1* | 7/2009 | Duparre | H10F 39/802 348/340 |
| 2015/0070466 | A1* | 3/2015 | Leung | H04N 13/257 348/46 |
| 2016/0112625 | A1* | 4/2016 | Namiki | H04N 23/958 348/239 |
| 2021/0271003 | A1* | 9/2021 | Yang | G02B 5/285 |

* cited by examiner

*Primary Examiner* — Twyler L Haskins
*Assistant Examiner* — Wesley J Chiu
(74) *Attorney, Agent, or Firm* — Meitar Patents Ltd.; Daniel Kligler

(57) ABSTRACT

An image sensing device includes a detector assembly, which includes a matrix of optical sensing elements having a predefined pitch. Each optical sensing element includes an active area having a width that is less than 90% of the pitch. An array of optical apertures are respectively aligned with the optical sensing elements such that each optical aperture is positioned at a distance from a respective optical sensing element that is no less than twice the width of the active area. Objective optics are configured to focus light from a scene onto the detector assembly.

17 Claims, 2 Drawing Sheets

IMAGING ARRAY WITH DIRECTIONAL RESPONSE

CROSS-REFERENCE TO RELATED APPLICATION

This application claims the benefit of U.S. Provisional Patent Application 63/405,442, filed Sep. 11, 2022, which is incorporated herein by reference.

FIELD OF THE INVENTION

The present invention relates generally to optoelectronic devices, and particularly to compact electronic imaging cameras.

BACKGROUND

An image-space telecentric lens has an aperture stop at the front focal plane of the lens, often located between the lens and the object that is to be imaged by the lens. This configuration is advantageous, inter alia, in that it substantially reduces optical aberrations at the rear focal plane of the lens. An image sensor at the rear focal plane will thus capture sharper images than would be produced by the same lens without the front aperture stop.

The terms "light" and "optical radiation" are used interchangeably in the present description and in the claims to refer to electromagnetic radiation in any of the visible, infrared, and ultraviolet ranges of the spectrum.

SUMMARY

Embodiments of the present invention that are described hereinbelow provide improved optical designs for electronic imaging, as well as cameras implementing such designs.

There is therefore provided, in accordance with an embodiment of the invention, an image sensing device, which includes a detector assembly, including a matrix of optical sensing elements having a predefined pitch. Each optical sensing element includes an active area having a width that is less than 90% of the pitch. An array of optical apertures are respectively aligned with the optical sensing elements such that each optical aperture is positioned at a distance from a respective optical sensing element that is no less than twice the width of the active area. Objective optics are configured to focus light from a scene onto the detector assembly.

In a disclosed embodiment, the array of optical apertures is positioned in a rear focal plane of the objective optics.

In some embodiments, the objective optics include a singlet lens. In disclosed embodiments, the singlet lens is selected from a group of optical elements consisting of diffractive optical elements and metasurface optical elements.

Additionally or alternatively, the device does not include an aperture stop other than the array of optical apertures in the detector assembly.

In some embodiments, the width of the active region is less than 80% of the pitch or even less than 50% of the pitch.

In one embodiment, the matrix of optical sensing elements includes a material between the active areas that absorbs at least 80% of optical radiation that is incident on the material within an operating spectral range of the device. Additionally or alternatively, the array of optical apertures includes microlenses disposed respectively in the optical apertures. Further additionally or alternatively, the detector assembly includes baffles disposed between the optical sensing elements and configured to prevent light passing through each optical aperture from impinging on any of the optical sensing elements other than the respective optical sensing element with which the optical aperture is aligned.

There is also provided, in accordance with an embodiment of the invention, a method for image sensing, which includes providing a matrix of optical sensing elements having a predefined pitch. Each optical sensing element includes an active area having a width that is less than 90% of the pitch. An array of optical apertures is aligned with the optical sensing elements such that each optical aperture is positioned at a distance from a respective optical sensing element that is no less than twice the width of the active area. Objective optics are positioned to focus light from a scene onto the detector assembly.

There is additionally provided, in accordance with an embodiment of the invention, a detector assembly, including a matrix of optical sensing elements having a predefined pitch. Each optical sensing element includes an active area having a width that is less than 90% of the pitch. An array of optical apertures are respectively aligned with the optical sensing elements such that each optical aperture is positioned at a distance from a respective optical sensing element that is no less than twice the width of the active area.

The present invention will be more fully understood from the following detailed description of the embodiments thereof, taken together with the drawings in which:

DETAILED DESCRIPTION OF EMBODIMENTS

Figure 1A:
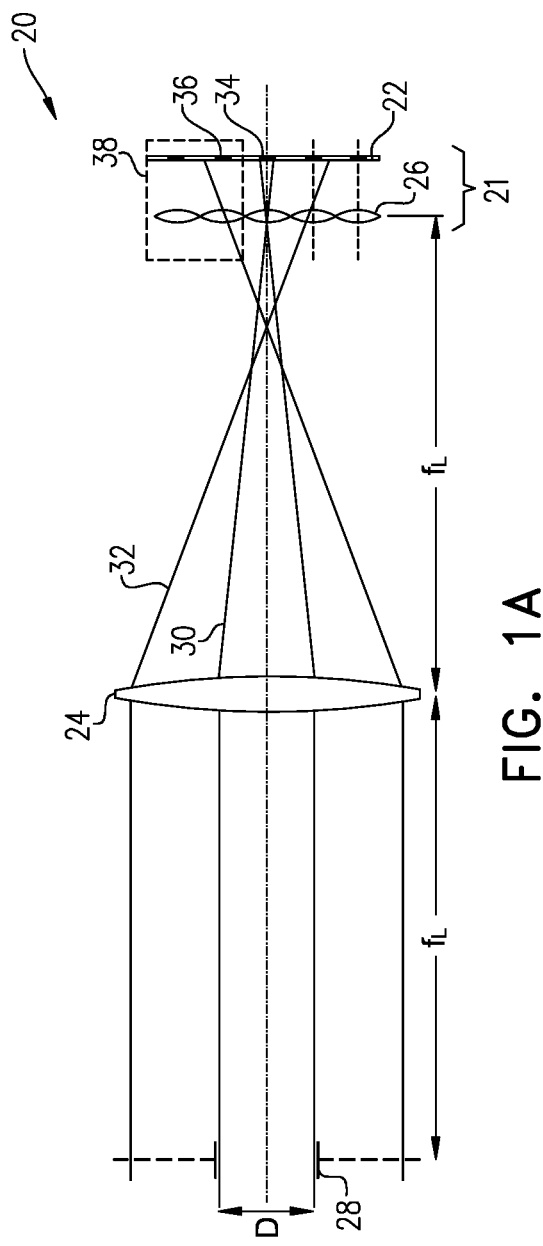
FIGS. 1A and 1B are schematic side views of an image sensing device, showing on-axis and off-axis ray traces, respectively, in accordance with an embodiment of the invention.

Image-space telecentric designs are useful in improving image quality in electronic imaging devices, especially when using a single optical element for imaging. The effectiveness of the front aperture stop in suppressing optical aberrations makes it possible to achieve a desired level of image quality with a simpler lens than would otherwise be needed, and even with a singlet lens in some cases. The addition of the aperture stop 1020 ahead of the lens, however, roughly doubles the total track length (TTL) of the optical system. Therefore, such designs are unsuitable for use in compact cameras, such as cameras incorporated in mobile telephones, for which TTL is a critical constraint.

Embodiments of the present invention that are described herein use a detector assembly with a strong directional response to emulate the effect of a front aperture stop. The directionality of the response is engendered by limiting the active areas of a matrix of optical sensing elements in the detector assembly, along with positioning optical apertures in front of the optical sensing elements. The limited widths of the active areas together with the distance to the optical apertures define an acceptance angle, which is projected forward by the objective optics to create an effective aperture stop of the desired diameter in the object space of the lens.

This effective aperture stop substantially reduces image degradation due to aberrations of the objective optics, almost as though there were an actual physical aperture in front of the objective optics (although no physical aperture stop is used, other than the array of optical apertures in the detector assembly). Designs of this sort are thus particularly useful in producing compact image sensing devices with a short TTL and simple objective optics. In some embodiments, the objective optics comprise a singlet lens, which may be a flat lens, such as a diffractive optical element or metasurface optical element. The configurations of the active areas of the optical sensing elements and the optical apertures may advantageously be chosen to position the effective aperture at the front focus of the objective optics, thus emulating the characteristics of a telecentric system.

Alternatively, the configurations may be chosen to place the effective aperture stop in a location closer to or farther from the front surface of the objective optics, or even in a location off the optical axis of the objective optics, using an asymmetric configuration of the active areas and apertures.

In other embodiments, the principles of the present invention may be applied in conjunction with objective optics comprising multiple optical elements. In such embodiments, the active areas of the optical sensing elements and the locations of the optical apertures in front of the optical sensing elements may be chosen to place an effective aperture stop in a position where a physical stop cannot be placed, for example inside the bulk of one of the optical elements.

In the embodiments that are described hereinbelow, an image sensing device comprises a detector assembly, comprising a matrix of optical sensing elements having a predefined pitch, and an array of optical apertures, which are respectively aligned with the optical sensing elements. Objective optics focus light from a scene onto the detector assembly. Each optical sensing element comprises an active area having a width that is less than 90% of the pitch (and which may be less than 80% or even less than 50% of the pitch, depending on the desired diameter of the effective aperture). Each optical aperture is positioned at a distance from the respective optical sensing element that is no less than twice the width of the active area. In the disclosed embodiments, to emulate infinite-conjugate optics, the array of optical apertures is positioned at the rear focal plane of the objective optics.

In some embodiments, the array of optical apertures comprises microlenses disposed respectively in the optical apertures, to enhance the optical efficiency of the detector assembly. Alternatively or additionally, the detector assembly may comprise other means for enhancing optical efficiency and reducing crosstalk and other detrimental effects of aberrations of the objective optics, such as the use of optically absorbing material between the active areas of the optical sensing elements; baffles between the optical sensing elements; and angle-selective thin-film coatings on the optical elements. The optically absorbing material may comprise the same material as is used in the active areas of the optical sensing elements. In one embodiment, this approach may be implemented by reading out signals from alternating pixels in the matrix, while the intervening, neighboring pixels serve as optical absorbers.

Figure 1B:
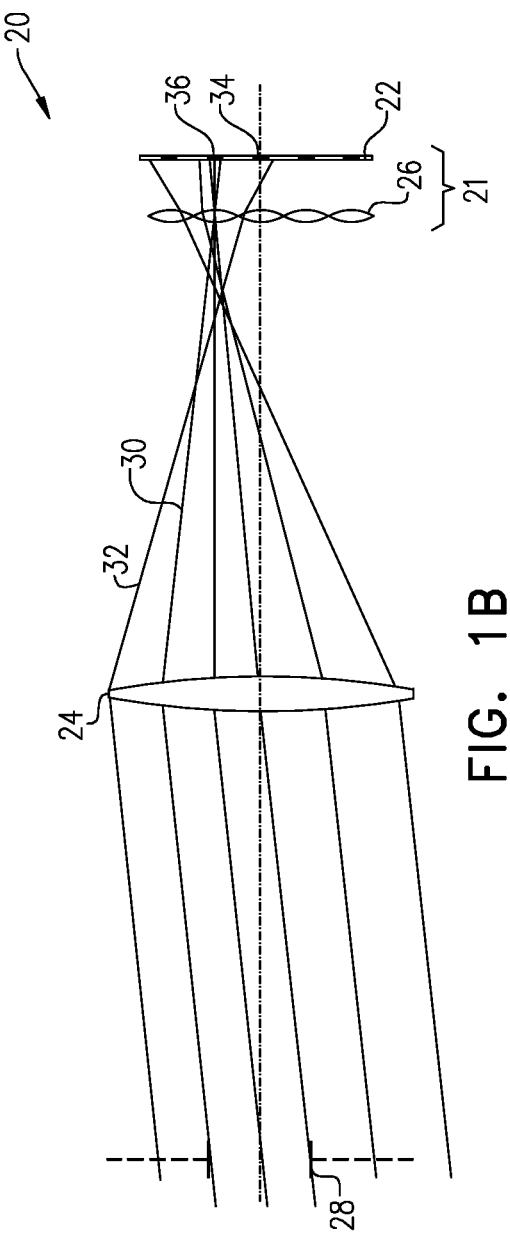
Figure 2:
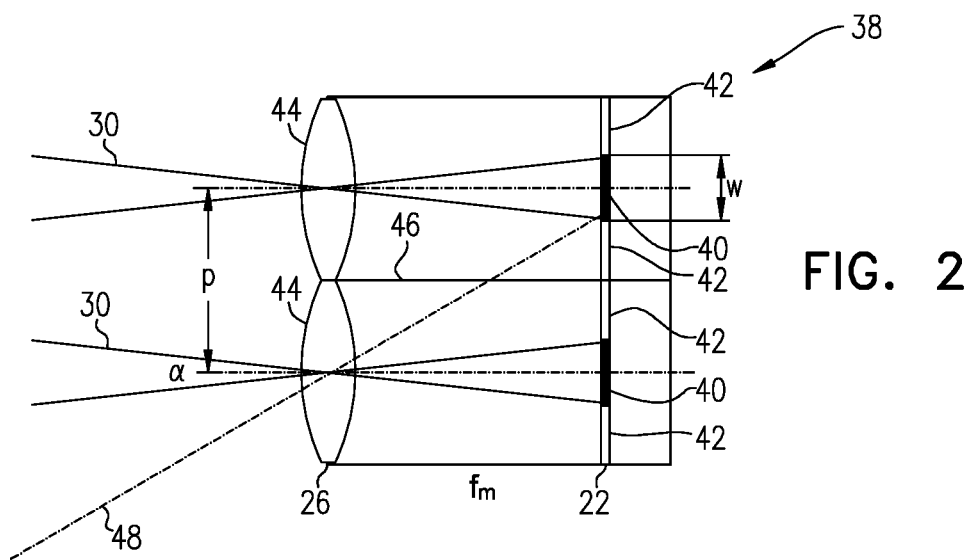
FIG. 2 is a schematic detail view of imaging elements used in the device of FIGS. 1A/B, in accordance with an embodiment of the invention.

Reference is now made to FIGS. 1A/B and 2, which schematically illustrate an image sensing device 20, in accordance with an embodiment of the invention. FIGS. 1A and 1B are schematic side views of device 20, showing on-axis and off-axis ray traces, respectively. FIG. 2 is a schematic detail view of imaging elements used in device 20, corresponding to an inset 38 in FIG. 1A. The drawings are not to scale.

Image sensing device 20 comprises a detector assembly 21 and objective optics 24, which focus light from a scene onto detector assembly 21. In the pictured embodiment, objective optics 24 comprise a singlet refractive lens. In other embodiments, objective optics 24 may comprise a singlet diffractive or metasurface optical element. Alternatively, objective optics 24 may comprise multiple optical components, which may be refractive, diffractive, and/or metasurface-based.

Detector assembly 21 comprises a matrix 22 of optical sensing elements 34, 36, . . . , for example CMOS sensing elements on a silicon substrate. Alternatively, the principles of this embodiment may be applied to any other suitable type of sensing elements and substrate. Matrix 22 has a pitch (P), defined as the center-to-center distance between adjacent sensing elements 34, 36, . . . . Although only a few, widely spaced sensing elements are shown in the figures, matrix 22 typically comprises much smaller, tightly-spaced optical sensing elements. Furthermore, although only a single column of sensing elements 34, 36, . . . , is shown in the figures, in practice the sensing elements are typically arranged in a two-dimensional matrix having multiple rows and columns. In the present description, it is assumed that the pitch is the same along both the row and column axes, although the principles of the present invention may similarly be applied, mutatis mutandis, to image sensing arrays having different row and column pitches.

Each optical sensing element 34, 36, . . . , comprises an active area 40 having a width w that is less than 90% of the pitch. The "active area" of a given sensing element refers to the area within which incident photons give rise to photocharge, which is then collected by the readout circuit of the sensing element. In typical image sensors, the active area is made as large as possible (within the bounds of the pitch), to maximize the sensitivity of the image sensor. In the present embodiments, however, active area 40 is limited in order to narrow the directionality of the response of the sensing elements. In some embodiments of the present invention, the width of active areas 40 is less than 80% of the pitch, or even less than 50% of the pitch, as in the example shown in FIG. 2.

In the present embodiments, the area of matrix 22 between active areas 40 is filled with a light-absorbing material 42, which absorbs at least 80% of the optical radiation that is incident on material 42 within the operating spectral range of device 20. For example, material 42 may comprise a black mask, such as a layer of black photoresist material. As another example, material 42 may comprise a photosensitive material, possibly the same material as in active areas 40, but coupled to a charge sink rather than to the readout circuits. Additionally or alternatively, trenches (not shown) may be etched between active areas 40 to reduce crosstalk between adjacent sensing elements.

An array 26 of optical apertures are respectively aligned with optical sensing elements 34, 36, . . . . Each optical aperture is positioned at a distance $f_m$ from a respective optical sensing element that is no less than twice the width of active area 40. In the present embodiment, the optical apertures in array 26 are defined by microlenses 44 disposed in the optical apertures. Although microlenses 44 are shown in the present figures as refractive elements, the microlenses may alternatively comprise optical elements of other sorts, such as diffractive or metasurface optical elements.

Furthermore, although microlenses 44 are shown in FIG. 2 as having their optical axes centered on the corresponding active areas 40, the microlenses may alternatively be decentered relative to the corresponding active areas. For example, the location of the effective aperture can be shifted by adding an offset that increases or decreases with radial distance from the center of array 26.

In the embodiment shown in FIG. 2, baffles 46 extend between the edges of microlenses 44 and the optical sensing elements in matrix 22 to prevent light passing through a given microlens 44, such as a high-angle ray 48, from impinging on any of the neighboring optical sensing elements. Thus, light passing through any given microlens will impinge only on the respective optical sensing element with which the optical aperture is aligned.

The width w of active areas 40 and the distance $f_m$ to the optical apertures (where microlenses 44 are positioned) define the acceptance angle of the sensing elements as $\alpha = 2\arctan(w/(2f_m))$. Objective optics 24 project this acceptance angle onto an effective aperture 28 in the object space of the objective optics. Assuming objective optics 24 to have an effective focal length $f_L$, with the optical apertures positioned in the back focal plane of objective optics 24, effective aperture 28 will be located in the front focal plane of the objective optics, with a diameter $D \cong \alpha f_L$.

Objective optics 24 image rays passing through effective aperture 28 into a cone 30 of angular width a, which is focused onto active areas 40 of sensing elements 34, 36, . . . . . Peripheral rays 32, falling outside effective aperture 28, impinge on light-absorbing material 42 or on baffles 46 and thus do not contribute to the image signal output by detector assembly 21. Therefore, effective aperture 28 mitigates the strong aberrations that would otherwise result from these peripheral rays.

Figure 3:
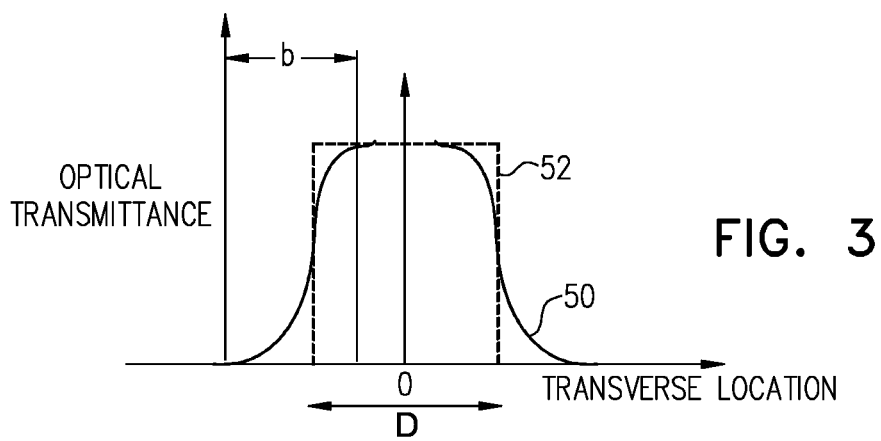
FIG. 3 is a plot that schematically illustrates the effective optical aperture of the image sensing device of FIGS. 1A/B, in accordance with an embodiment of the invention.

FIG. 3 is a plot that schematically illustrates the effective optical transmittance of aperture 28, in accordance with an embodiment of the invention. The actual optical transmittance is shown by a curve 50, indicating that the optical transmittance drops off gradually at the edges of aperture 28, in contrast to a sharp top-hat profile 52 of an actual physical aperture of the same diameter. The width of the resulting blur margin b, as defined in FIG. 3, is given by $b = f_L \lambda / P$.

Figure 4:
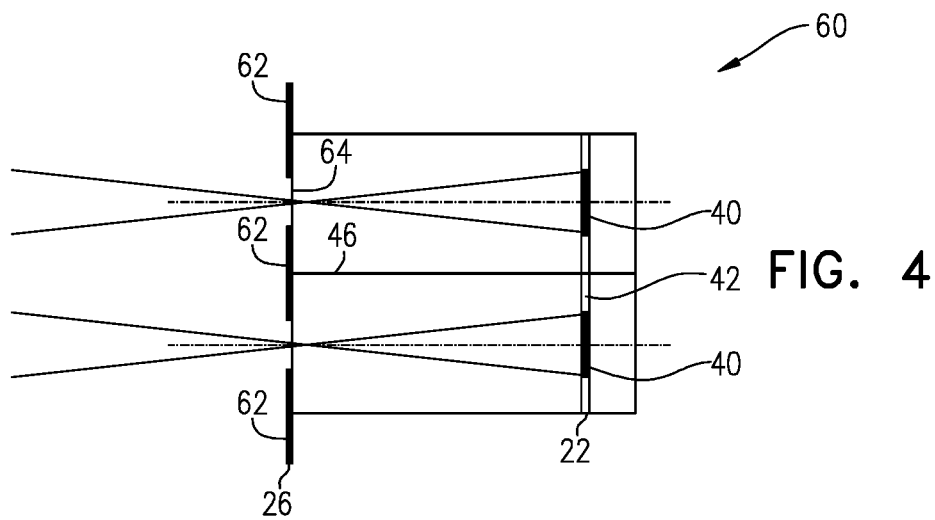
FIG. 4 is a schematic detail view of imaging elements used in an image sensing device, in accordance with an alternative embodiment of the invention.

FIG. 4 is a schematic detail view of imaging elements 60 used in an electronic imaging device, in accordance with an alternative embodiment of the invention. These imaging elements may be used in device 20, for example, in place of the imaging elements shown in inset 38 (FIG. 2). In imaging elements 60, microlenses 44 are replaced by pinhole apertures 64, which are formed by baffles 62. Alternatively, in other embodiments, any other suitable sorts of optical components or structures may be used in creating the array of apertures.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An image sensing device, comprising:
  a detector assembly, comprising:
    a matrix of optical sensing elements having a predefined pitch, each optical sensing element comprising an active area having a width that is less than 90% of the pitch; and
    baffles disposed between the optical sensing elements and defining an array of optical apertures, which are respectively aligned with the optical sensing elements such that each optical aperture is positioned at a distance from a respective optical sensing element that is no less than twice the width of the active area; and
  objective optics configured to focus light from a scene onto the detector assembly, such that the array of optical apertures is positioned in a rear focal plane of the objective optics, and the objective optics image the optical apertures into object space to create an effective aperture in the space, object which reduces image degradation due to aberrations of the objective optics.

2. The device according to claim 1, wherein the objective optics comprise a singlet lens.

3. The device according to claim 2, wherein the singlet lens is selected from a group of optical elements consisting of diffractive optical elements and metasurface optical elements.

4. The device according to claim 1, wherein the device does not comprise an aperture stop other than the array of optical apertures in the detector assembly.

5. The device according to claim 1, wherein the width of the active area is less than 80% of the pitch.

6. The device according to claim 5, wherein the width of the active area is less than 50% of the pitch.

7. The device according to claim 1, wherein the matrix of optical sensing elements comprises a material between the active areas that absorbs at least 80% of optical radiation that is incident on the material within an operating spectral range of the device.

8. The device according to claim 1, further comprising microlenses disposed respectively in the optical apertures.

9. The device according to claim 1, wherein the baffles are configured to prevent light passing through each optical aperture from impinging on any of the optical sensing elements other than the respective optical sensing element with which the optical aperture is aligned.

10. A method for image sensing, comprising:
  providing a matrix of optical sensing elements having a predefined pitch, each optical sensing element comprising an active area having a width that is less than 90% of the pitch;
  positioning baffles between the optical sensing elements so as to define an array of optical apertures in alignment with the optical sensing elements such that each optical aperture is positioned at a distance from a respective optical sensing element that is no less than twice the width of the active area; and
  positioning objective optics to focus light from a scene onto the optical sensing elements, such that the array of optical apertures is positioned in a rear focal plane of the objective optics, and the objective optics image the optical apertures into object space to create an effective aperture in the object space, which reduces image degradation due to aberrations of the objective optics.

11. The method according to claim 10, wherein the objective optics comprise a singlet lens.

12. The method according to claim 11, wherein the singlet lens is selected from a group of optical elements consisting of diffractive optical elements and metasurface optical elements.

13. The method according to claim 10, wherein the width of the active area is less than 80% of the pitch.

14. The method according to claim 13, wherein the width of the active area is less than 50% of the pitch.

15. The method according to claim 10, wherein the matrix of optical sensing elements comprises a material between the active areas that absorbs at least 80% of optical radiation that is incident on the material within an operating spectral of range the optical sensing elements.

16. The method according to claim 10, further comprising providing microlenses disposed respectively in the optical apertures.

17. The method according to claim 10, wherein the baffles are positioned between the optical sensing elements so as to prevent light passing through each optical aperture from impinging on any of the optical sensing elements other than the respective optical sensing element with which the optical aperture is aligned.

* * * * *